UNITED STATES PATENT OFFICE 2,139,866

PRODUCTION OF AQUEOUS DISPERSIONS OF CELLULOSE DERIVATIVES

Charles Richard Noel Strouts, Ardrossan, Scotland, assignor to Imperial Chemical Industries Limited, a corporation of Great Britain No Drawing. Application June 9, 1936, Serial No. 84,385. In Great Britain June 12, 1935

4 Claims. (Cl. 134—79)

This invention relates to the production of dispersions in aqueous media of cellulose derivatives of the kind soluble in organic solvents but not normally soluble in water. The invention relates especially to the production of aqueous dispersions of cellulose esters such as nitrocellulose, particularly industrial nitrocellulose, cellulose acetate, cellulose ethers such as ethyl cellulose, benzyl cellulose and other water insoluble similar cellulose derivatives which are normally employed for industrial purposes in the form of solutions in organic solvents.

It has been proposed to prepare aqueous dispersions of cellulose derivatives insoluble in water but soluble in organic solvents by directly dispersing the cellulose derivative in water with the aid of water soluble materials having colloidal properties, more particularly with the aid of cellulose derivatives soluble in water.

It is also known that aqueous emulsions of solutions in volatile organic solvents of water insoluble cellulose derivatives can be produced by agitating solutions of the cellulose derivatives in the volatile organic solvents with water in the presence of dispersing agents or water soluble materials having colloidal properties. In such emulsions the cellulose derivative is dissolved in the form of a relatively dilute solution in a volatile organic solvent, the particles of which solution are emulsified, and the industrial development of the emulsions employed for film forming purposes necessitates the usual safety precautions attendant upon the transport and evaporation of volatile organic solvents required in handling cellulose derivative lacquers.

An object of the present invention is an improved method of producing aqueous dispersions of cellulose derivatives of the kind insoluble in water but soluble in water miscible organic solvents. Another object of the invention is the production of such dispersions substantially free from volatile organic solvents, and a further object of the invention is the production of aqueous dispersions of cellulose derivatives of the kind described having improved properties. A still further object of the invention is the production of aqueous dispersions of cellulose derivatives of the kind described in which the concentration of the cellulose derivative is higher than in the hitherto known aqueous dispersions of water insoluble cellulose derivatives.

According to the present invention the dispersion is produced by precipitation with water from a solution of the cellulose derivative in an organic solvent containing also a protective agent dissolved in it, the cellulose derivative being thus obtained in a separable but redispersable form, and is separated from the bulk of the liquid, after which it may be redispersed by adding to the still moist paste or concentrate any suitable aqueous medium. The possibility of obtaining the cellulose derivative in a redispersable form does not appear to have been realized by prior workers. While in order to separate the cellulose in redispersable form and prepare aqueous dispersions from the separated material according to my invention it is not essential that a plasticizer or softening agent should be present, unplasticized or unsoftened cellulose derivative dispersions are of relatively little industrial interest, and it will usually be found necessary in order that clear and coherent films may be obtained from the dispersions produced according to my invention that as well as the cellulose derivative and the protective agent there should be dissolved in the organic solvent a material which has a softening or plasticizing effect for the cellulose derivative, and which is precipitated with it when the solution is treated with water. Other methods of introducing a plasticizing agent into the final dispersion may, however, be applied.

It is usual to employ plasticizing agents or softening agents along with cellulose derivatives for nearly all industrial purposes, and the customary water immiscible plasticizers may be used for the purposes of the present invention. Owing to the fact that when films are deposited from solution in volatile organic solvents according to the usual method quite an appreciable proportion of volatile solvent is retained over a long period of time and thus in addition to the plasticizer at least temporarily contributes to the softening of the film, there may be used a somewhat higher percentage of plasticizer according to my invention than would yield a freshly cast film of equal pliability made in the usual way from solution in volatile organic solvents. The films produced according to my invention are correspondingly less liable to change in softness on prolonged exposure.

In order to put my invention into effect it is necessary to select a cellulose derivative solvent which is miscible with water, and a protective agent which is soluble both in the organic solvent and in even highly diluted solutions thereof. The presence of a small amount of water insufficient to initiate the precipitation of the cellulose derivative may be found in some instances to facilitate the solvent effect of the organic solvent of the cellulose derivative for the protective agent.

The protective agent may for instance be of a colloidal nature, such as certain proteins or like material, in which case an aliphatic carboxylic acid is a suitable organic solvent. Thus, in the case of nitrocellulose I have found that gelatine or glue may be employed, using glacial acetic acid as the water miscible solvent for the nitrocellulose. While with acetone soluble cellulose acetate I have found that although these materials may be used it is preferable to use glucose-amine (Daktose), with lactic acid as the water miscible solvent; other protective agents and solvents may, however, be employed. The plasticizer or softening agent should also be soluble in the organic solvent and precipitate from the solution on the addition of water. The function of the protective agent employed in the process of the invention is to stabilize the finely divided cellulose derivative as first precipitated and to prevent coagulation thereof and suitable materials fulfilling these functions will be evident to those skilled in the art.

By controlling the temperature of the solution prior to the precipitation of the cellulose derivative, a certain control of the particle size of the dispersions may sometimes be achieved, the tendency being in general for the particle size to be smaller at temperatures above atmospheric than at lower temperatures.

In order to precipitate the dispersed cellulose derivatives, the solution containing also the protective agent and any plasticizing or softening agent to be used in solution, is subjected while being agitated to slow dilution with water if desired at a somewhat elevated temperature, the water being gradually incorporated therewith to such an extent as to precipitate the cellulose derivative with the plasticizing softening agent in a highly dispersed condition, which will be evidenced by a milky appearance of the mixture. This operation may be conducted by adding to the solution a gradually increasing amount of a solution of the organic solvent in water, but it is also possible to achieve the desired result by the addition of water alone. The addition should be gradual.

The bulk of the aqueous liquor may be removed by flocculating by addition of a suitable aqueous solution, allowing to settle somewhat and pouring off the supernatant layer and centrifuging. Alternative methods of separation are centrifuging, dialysis, electrophorisis or the like. The concentrate may be then taken up in water or a suitable aqueous medium and further separation may be undertaken by centrifuging, dialysis, or the like. Thus when the organic solvent used is an acid the solutions may be rendered slightly alkaline, for instance by the addition of ammonia, and the supernatant liquor may be removed. The aqueous liquor used for washing the coagulum may if desired contain a proportion of a protective agent, but this is not usually necessary. The concentrate should not be allowed to dry.

In this manner the organic solvent used may be entirely removed and the cellulose derivative may be obtained in the form of a mud or paste containing a high concentration of the cellulose derivative, which can be redispersed while still moist by taking it up in a suitable aqueous medium. The aqueous liquid may, for instance, be slightly acid or slightly alkaline and should be chosen so that the resulting solution is somewhat removed from the isoelectric point of the residual or added protective agent. In taking up the mud or paste the use of a colloid mill facilitates the redispersion. The final dispersion may if desired have a concentration of nitrocellulose as high or exceeding 25%.

The dispersions prepared according to my invention are latex-like in appearance, and they may be used for the purposes of making films, impregnating paper and textiles, forming lacquers and coating compositions and the like. In applying the compositions these may be spread, sprayed, brushed or applied by other known methods and deposit the material in the form of a film on evaporation. It is sometimes advisable to include with the aqueous liquor used for redispersing the mud or paste a small proportion of a water-soluble organic solvent for nitrocellulose, insufficient in amount to saturate the water, in order to enhance the appearance of the film. High or medium boiling solvents such for instance as ethyl lactate are particularly suitable for this purpose.

The dispersions prepared according to my invention usually show Brownian movement, and as in the case of rubber latex it is usually desirable to shake them up before application. If desired pigments, fillers, and the like may be incorporated with them.

Protective agents may be introduced into the dispersing agents during or after the redispersion of the mud or paste, but this may not be necessary since the protective agent used in the original solution of the cellulose derivative may not be removed entirely in the process, although its amount may be very considerably reduced in the course of it.

The invention is further illustrated by the following examples in which the parts are parts by weight:

*Example 1*

120 parts of a plastic mass containing 60 parts of industrial nitrocellulose of medium viscosity and 60 parts dibutyl phthalate are dissolved together with 30 parts gelatine in 168 parts glacial acetic acid in an incorporating machine until the mass is homogeneous. 150 parts of 2% aqueous solution of acetic acid are then incorporated very slowly at the start and at a gradually increasing rate so that precipitation is gradual. The mass changes from a highly viscous mass to a milky fluid during the process.

100 parts of the dilute acid dispersion so obtained is diluted with 100 parts water and run carefully into a mixture of 160 parts ammonia (sp. gr. .880) with 140 parts water. The alkaline milk so obtained is run through a high speed continuous centrifuge at such a rate that the washings come through almost clear, and the cake remaining is redispersed by stirring into ½% ammonia, and may if desired be run through the centrifuge once again and similarly redispersed in order to effect a further reduction in the gelatine and ammonium acetate content. The final dispersion shows Brownian movement.

By evaporation of an extended surface at temperatures of about 45° C. a clear glossy flexible film is obtained. The composition may be used as a leather lacquer in the form of a 25% dispersion.

*Example 2*

100 parts of the nitrocellulose used in Example 1 are incorporated with 50 parts dibutyl phthalate dissolved in 100 parts glacial acetic acid. With this solution is incorporated a solution of 36 parts pellet glue in 125 parts glacial acetic acid until a homogeneous mass results. This was diluted with 150 parts dilute 2% acetic acid and worked up as in Example 1.

Example 3

120 parts industrial nitrocellulose (11.4% nitrogen) and 60 parts of dibutyl phthalate were dissolved in 450 parts glacial acetic acid containing 9 parts of gelatine in solution. The nearly clear solution became quite clear in appearance after 30 parts of water had been added, with agitation. It was then heated to 60–70° C. and a further quantity of water amounting to about one and one half times the weight of acetic acid was then slowly introduced over about 1½ hours while the solution was kept agitated by mechanical working. The mixture was then centrifuged while hot, and the concentrate was taken up in hot 2% acetic acid and re-centrifuged, this centrifuging and suspension being repeated until the gelatine content was reduced to 2 to 3% calculated on the dry material.

Example 4

90 parts industrial nitrocellulose (11.4% nitrogen); 90 parts dibutyl phthalate and 9 parts gelatine were dissolved in 450 parts glacial acetic acid, the mixture being worked together and warmed to 60–70° C. until smooth. Into the solution there were gradually introduced 450 parts water, and the milky suspension so obtained was rendered neutral to phenol phthalein by addition of dilute sodium hydroxide solution. The resulting flocculum was freed from the bulk of the aqueous liquor by centrifuging and the concentrate was taken up in 2% acetic acid and again centrifuged. The final concentrate was taken up in colloid mill in 2% acetic acid or ½% ammonia. Instead of being flocculated by the addition of alkali, the milky suspension obtained on dilution of the solution in glacial acetic acid may be dialyzed until the acetic acid concentration is reduced to 2%, whereupon the suspension may be centrifuged and taken up into 2% acetic acid to the desired concentration.

Example 5

16 parts cellulose acetate (51.1% acetyl value) was dissolved along with 8 parts beta-methoxy ethyl phthalate and 6 parts Daktose in 64 parts lactic acid, by mechanical working. To the solution there was added over 1 hour 200 parts 2% lactic acid, while still working. The milky suspension was repeatedly centrifuged and taken up with 2% lactic acid repeatedly.

It is apparent that many widely different embodiments of this invention may be made without departing from the spirit and scope thereof; and, therefore, it is not intended to be limited except as indicated in the appended claims.

I claim:

1. Process of preparing an easily dispersable aqueous cellulose nitrate composition which comprises dissolving nitrocellulose and dibutyl phthalate in glacial acetic acid containing a small amount of gelatine, adding water and continually mixing, heating the mixture to 60 to 70° C., adding a further quantity of water slowly and separating the cellulose derivative from the bulk of the liquid.

2. Process of preparing a cellulose nitrate dispersion which comprises dissolving one part of the cellulose derivative and one part of solvent plasticizer in five parts of an organic acid and incorporating into the mass a small amount of a protective agent, mixing at a temperature of 60 to 70° C. until homogeneous, adding about five parts of water, neutralizing the suspension thus formed until neutral to phenolphthalein, separating the flocculum from the bulk of the aqueous liquor by centrifuging, taking up the cellulose nitrate in 2% acetic acid, and again centrifuging.

3. The method of preparing a film-forming aqueous dispersion of nitrocellulose which comprises subjecting to mechanical working, until a viscous solution is formed, nitrocellulose, an aliphatic carboxylic acid which is miscible with water and which is a solvent for the nitrocellulose, and an amino acid colloid which is soluble both in the carboxylic acid and in dilute aqueous solutions thereof; adding water gradually thereto with agitation until substantially all of the nitrocellulose has been thrown out of solution to form a milky liquid, and separating the bulk of the carboxylic acid from the said milky liquid.

4. Process of claim 3 in which the viscous solution prior to precipitation is heated to about 60 to 70° C.

CHARLES R. N. STROUTS.